United States Patent Office 3,330,181
Patented July 11, 1967

3,330,181
SURFACE EXPOSURE DEVICE FOR COPYING APPARATUS
Hans Jakobson, Quickborn, Holstein, Germany, assignor to Werner Zindler, trading as Lumoprint Zindler KG, Hamburg, Germany
Filed Mar. 24, 1965, Ser. No. 442,429
Claims priority, application Germany, Mar. 28, 1964, L 47,439
13 Claims. (Cl. 88—24)

This invention relates to a surface exposure device for copying apparatus, in which an exposure aperture is movable past a support surface and a lens is arranged in the path of light rays between a slot-shaped exposure surface and copying material movable in association therewith. The invention also relates to a particularly advantageous embodiment of a copying apparatus with a surface exposure device.

The so-called exposure aperture means the image area on the original which is reproduced on the copying material. This image area is located, for instance, between longitudinally-extending exposure light sources which are arranged on a carriage and are thus movable. The aperture, i.e. the exposure aperture, can however be formed by a slot-like opening in a shutter. This is advantageous, for example, if the original is illuminated from behind or if a projected image is reproduced on the support surface.

These embodiments are included.

It is known to operate surface exposure devices by the reflected exposure method. These devices do not have an objective lens. However, reflex exposure is not always practical. It permits the use of two-sided originals, is limited to a particular copying material which is pervious to light and admits of no alteration of the properties on passage of the rays in either direction.

The invention relates particularly to an optical surface exposure device which is provided with a lens and in which the image from the original is transferred to the copying material through a lens by way of a ray path. In this way, originals printed on both sides can be reproduced, which was not possible according to a transillumination method, not described herein. This latter arrangement requires a complicated optical system and a great deal of space.

In order to avoid the expense which would be incurred with optical exposure if the whole original were dealt with at the same time, it is known to move a slot-shaped exposure aperture, arranged with exposure light sources on a carriage past the original, and also to move the lens corresponding to the resultant movement of the ray path.

In this way, the invention relates particularly to an arrangement in which a slot-shaped image-reproducing aperture, e.g. in a shutter, corresponding to the exposure aperture is associated with the copying material, the image-reproducing aperture being arranged to be stationary and the copying material being moved past it at a speed which is synchronised with the speed of movement of the exposure aperture. The ratio of the speeds of movement of the exposure aperture and the copying material corresponds to a chosen decreasing ratio.

According to U.S. Patent 3,062,094, for example, in an arrangement of this kind the lens is movable parallel to the support surface, in which case the superficial extent of the lens is also parallel to the support surface. The extent of movement of the lens amounts to only a fraction of the extent of movement of the exposure aperture which occurs simultaneously. The relationship between the distances travelled thus depends upon the spatial relation of the lens to the line intersecting the exposure aperture and the copying material. The lens is also mounted on a carriage. Both carriages, i.e. one for the exposure aperture and a second for the lens, are movable in different planes by means of cable lines which are driven by cable line pulleys having different diameters. The relationship between the diameters is adjusted to the above-mentioned relationship, which is dependent upon the spatial position of the lens between the original and the copying material.

This arrangement has several disadvantages. Only in the mid-position, i.e. in the central area beneath the original, does the image ray pass through the lens in a direction which coincides with the lens axis. In all other positions the lens is inclined to the image ray. As a result the angle of incidence is increased and this can only be overcome by greatly increasing the size of the lens. This results in an increase in the size of the apparatus. Furthermore, the adjustment of the lens is subject to inaccuracies since even precision-made rail guides lead to irregularities or to minimal inclinations on contamination, which acts disadvantageously on the exposure step, particularly if different rail systems are provided for two carriages in different planes.

With such arrangements it is also known, for example, to provide two mirrors in alignment parallel to the direction of movement of the carriages, and to move the lens, together with a shutter provided with the exposure aperture, by means of this mirror arrangement. In this connection, it is necessary to have a relatively large reflective surface which must always be held in perfect alignment. The two-mirror arrangement follows from such known arrangements, for example according to U.S. Patent 2,945,434, since a mirror-script image is to be obtained on copying material, a copy of which is transferred to further copying material.

If a correct image were to be obtained in such an arrangement, three mirrors would have to be provided, for example. These reflector surfaces, one dimension of which must correspond to the length of the originals and the other dimension of which must be proportional to the width of the originals, represent a considerable expense. When using an electrophotographic process, such an arrangement is not possible because, when using three mirrors, if the support surface is arranged horizontally in the normal manner, the copying material which is to be exposed must lie in a vertical plane with the direction of travel parallel to the support surface. With such an arrangement, however, problems arise in developing a latent image by the application of developer powder since the latter has a component of movement extending laterally over the image because of the effect of gravity. Known devices with two mirrors are also subject to this disadvantage, so that a transfer copying material is used.

The mirror arrangement described above also has the disadvantage that there is lateral staggering between the support surface and the copying material which is to be exposed, so that the dimensions of the apparatus are considerably increased.

The invention is directed to the problem of providing a surface exposure device which is not limited to the use of an electrophotographic process but has particular advantages when such process is used, and which projects a correct image on the copying material by using a carriage movable parallel to the support surface, whereby it is ensured that the ray path through the lens always coincides with the lens axis, i.e. independently of the actual position of the carriage carrying the exposure aperture, and moreover that an arrangement is provided which is extremely space-saving because of the deflection of the ray.

According to the invention, this problem is solved in that the lens is arranged to be stationary in known manner and a mirror arrangement is provided, consisting of two mirrors movable with respect to each other, whose movement maintains constant the length of the ray path between the original and the lens independently of the spatial position of the carriage relative to the support surface.

In this manner, the additional advantage is obtained that the distances between the original and the lens on the one hand and between the latter and the copying material on the other hand always remain the same. This is not the case if, as in known arrangements, the lens is moved parallel to the support surface. In this case, the ratio of these distances remains constant but the absolute values of the distances change.

According to an important preferred feature of the invention, the axis of the lens coincides with the normal to the surface in the centre of the area of the copying material to be exposed. Consequently, it is possible to use a considerably smaller lens which produces clear images, particularly at the edges, without any distortion. In this connection, a shorter focal length than in known devices can be used in order to obtain perfect images. In known arrangements, it is necessary for the lens to have a longer focal length because the angle of incidence must be increased.

In particular, in the invention the ray path from the last mirror of the mirror arrangement to the lens coincides with the lens axis.

According to a preferred embodiment of the invention having a carriage for the exposure aperture, the carriage comprises two parts which are movable relative to each other, one part carrying two mirrors and the other carrying one mirror and the shutter with the slot-shaped exposure aperture, the two parts of the carriage being relatively movable so that, on actuation, one part of the carriage moves half the distance travelled by the other part of the carriage but in the same direction as the latter. This ensures that the ray path from the original to the lens is always the same length regardless of the position of the carriage with the slot-shaped exposure aperture.

The lens is preferably arranged, in the direction of movement of the carriage, approximately in the centre beneath the support surface, with its axis running parallel to the latter. In this way, a particularly compact device is provided, which was not possible with known arrangements.

According to a preferred embodiment of the invention, movement of the carriage is controlled by means of a cable line with a guide pulley, the movable end of the cable line being secured to the part of the carriage carrying the frame members for the exposure aperture, and one mirror and the guide pulley being secured to the part of the carriage carrying two mirrors; the guide pulley or the associated carriage part is restrained against movement, on tightening of the movable end of the cable line, by means of a flexible spring.

It will be understood that other driving means lie within the scope of the invention, for example synchronised rack and pinion gear and drives with an adjustable lever system or motors which are separately excitable or operate with different velocities, or with drives which can have drive shafts operating at different velocities.

The mirrors required in the invention need only have a length equal to the width of the support surface and a width which depends on the width of the exposure aperture.

The embodiment with three mirrors has the advantage that a correct image is obtained and, in this connection, it is also pointed out that, with the deflection of the ray path according to the invention, the copying material moves in a plane which runs perpendicular to the support surface, the direction of movement likewise being perpendicular to the support surface. In this manner, after exposure, the copying material can be deflected into a plane parallel to the support surface or into a horizontal plane in which development, and possibly also powder distribution, is readily possible.

The invention will be explained below in conjunction with embodiments which are illustrated by way of example in conjunction with the accompanying drawings, in which.

Figure 1:
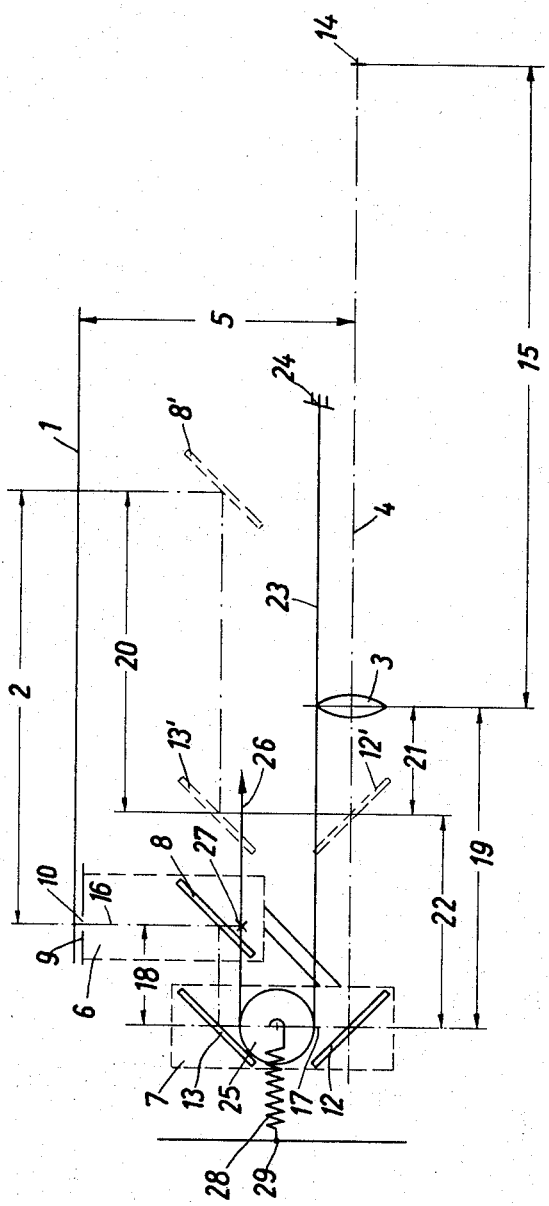
FIG. 1 illustrates the principle of the three-mirror device of the invention.

In the arrangement illustrated in FIG. 1, the support surface is indicated by the line 1. The area occupied by the original is shown at 2. The lens 3 is located approximately in the centre below this area. Its axis 4 extends parallel to the horizontal support surface 1. The vertical distance between this latter and the lens axis 4 is shown at 5.

In the apparatus, a carriage is movable parallel to the support surface on guide means not shown in FIG. 1. This carriage consists of a part 6 and a part 7. The part 6 has a first mirror 8 which is inclined at 45° with respect to the support surface 1. This carriage member 6 is also provided with a shutter 9 facing the support surface and having an exposure aperture 10.

The carriage member 7 is provided with two mirrors 12, 13 which form an angle of 90°. The upper mirror 13 is positioned at the same level as the mirror 8 and is similarly inclined. The optical axis of the mirror 12 coincides with the axis 4 of the lens 3.

The lens 3 is stationary in a housing, not shown. At 14, in the region of the optical axis 4, copying material is provided which is aligned, for example, behind a shutter, not shown, provided with a slot corresponding with the slot-shaped exposure aperture 10. The distance 15 between the lens 3 and the image-forming area at 14 is always the same.

When the carriage members are in the position described above, the exposure ray travels from the support surface 1 (the master) along paths perpendicular to surface 1 and which together equal the distance 5. This distance is made up of the section 16 between the support surface 1 and the mirror 8 and the section 17 between the mirrors 12 and 13.

A section 18 of the ray path extends between the mirrors 8 and 13 and a section 19 extends between the mirror 12 and the lens 3.

If the mirror 8 together with the members arranged on the same carriage part is moved parallel to the support surface 1 towards the right, as shown in FIG. 1, so that it is in the position 8' shown in dotted lines, the mirrors 13 and 12 are similarly moved to the positions 13' and 12'.

The vertical distances of the ray path in FIG. 1 obviously remain the same. The distance between the mirrors 8' and 13' is indicated at 20 and is longer than the distance 18, whereas the distance between the mirror 12' and the lens 3 is indicated at 21 and is shorter than the distance 19. With the length of the vertical distances remaining constant, the total of such distances being indicated at 5, the requirement of the invention consists in the sum of the distances 20, 21 or 18, 19 remaining constant, i.e. the sum of the distances between the mirrors 8, 13 on the one hand and between the mirror 12 and the lens 3 is constant. This is achieved in that the carriage member 7 is moved half the length of the distance travelled by the carriage member 6. If this carriage member 6 is moved between the mirror positions 8 and 8' by the distance 2, the carriage member 7 is obviously moved by the distance 22 which is half the distance 2.

FIG. 1 indicates a simple and reliable means for effecting this movement. This means consists of a cable line 23 which is secured at one end at 24 to the framework of the apparatus. The cable line is led round a guide pulley 25 which is rotatably mounted on the carriage member 7. The arrow-headed end 26 of the cable line is subject to movement in the direction of the arrow 26 by means not shown. At 27 the cable line is secured to the carriage member, for example.

A tension spring 28 is secured to the carriage member 7 or to the spindle of the guide pulley 25, the other end of this spring being secured, for example at 29, to the housing which is not illustrated in FIG. 1.

While the carriage member 6 is moved proportionally to the movement of the end 26 of the cable line, the carriage member 7 together with the guide pulley 25 moves half this distance, so that the afore-mentioned requirements are met.

Figure 2:
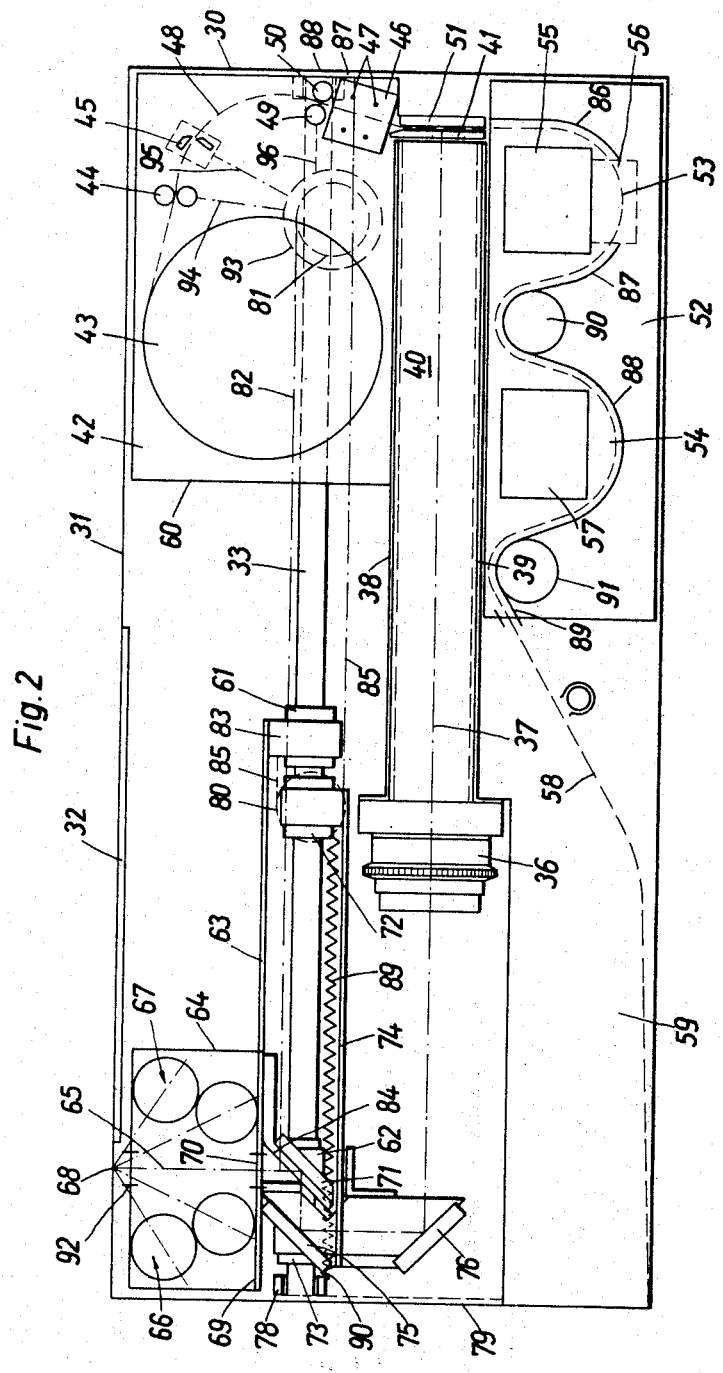
FIG. 2 is a schematic ilustration, in side view and partly in section, of one form of device in which the carriage with the exposure aperture is in one end position.

An apparatus is shown schematically in FIG. 2 in which the front wall is removed and certain other parts are omitted. This apparatus has an outer housing 30. A transparent support surface 32 for an original is provided in the upper side 31. Parallel to the support surface 32 and beneath and to one side thereof, rod-shaped guides are provided in the apparatus, one of these being indicated at 33. These rods 33 extend parallel to one another and to the housing walls running parallel to the plane of the drawing. These rods are so dimensioned that they are suitable for guiding the carriage members without tilting.

A lens 36 with a horizontal axis 37, i.e. parallel to the support surface 32, is rigidly mounted in the housing. This lens 36 is located approximately in the middle area beneath the support surface. A conduit 40 enclosed by walls 38, 39 extends between the lens and an exposure plate 41. This is pervious to rays and can, if required, be constructed as a shutter having a slot extending substantially horizontally.

Above the right-hand end of the conduit 40 is provided a compartment 42 for receiving a supply of copying material, illustrated as a spool 43, for example. If a spool of copying material is used, this is associated with withdrawal and cutting devices illustrated by friction rollers 44 and a knife 45. In the compartment 42, just before the exposure plate 41, there is a housing 46 with sensitising or charging devices, for example corona electrodes 47. The path of the copying material through the withdrawal device 44 and the cutting device 45 is shown by the dotted line 48 and can be defined, for example, by roller guide means 49, 50 which are positioned and driven in the housing.

A guide plate 51 is associated with the exposure plate 41 in order to hold the copying material flat on the exposure plate. Pressure means can be provided. Beneath the exposure plate the copying material is conveyed through a compartment 52 along a path which has two looped sections 53, 54, for example by means of guide surfaces 86–89 and rollers 90–91 which are not described in more detail. The two looped sections 53, 54 are open upwardly. For example, over the first section 53 a developer device 55 is provided which can comprise a powder-distributing device when treating electrophotographic material or a tray in which colouring matter particles are suspended in a liquid. The tray would be provided at 56. In addition spraying devices and the like can be provided.

A fixing device 57 is located above the section 54, for example a drying or fusing device. The copying material is conveyed along the dotted path 58 into a housing 59. The kind of apparatus construction shown is an essential feature of the invention since the copying material which is stored at 43 follows a practically L-shaped path, downwardly alongside the side wall 30, and then beneath the exposure device to the other wall of the apparatus. In this way a particularly space-saving solution is provided and a table apparatus of small dimensions with a surface exposure device is obtained which allows optical exposure of the original by means of a lens.

The compartment 42 is separated from the central compartment by a partition wall 60 and is provided at its upper side with the support surface 32, for example a glass plate, and the rods 33 of the guide device extend through the wall 60. A first carriage member is guided on these rods without inclination. This carriage member comprises at least one sliding sleeve 61 for example, but preferably includes a further sliding sleeve 62. The two sliding sleeves are arranged a certain distance apart and are connected by a rod 63.

On this first carriage member or the rod 63 is provided a box 64 in which exposure sources 66, 67 are arranged symmetrically about a perpendicular axis and also with respect to the central plane 65 extending perpendicular to the drawing plane; by means of reflectors (not illustrated) for example, the rays of these exposure sources are concentrated on a slot-shaped exposure aperture at 68 which can be arranged in the vicinity of a shutter 92.

The bottom 69 of the box 64 is open at 70 in the area of the plane 65 so that an image ray passing through the plane 65 can fall on to the mirror 71 (8 in FIG. 1). The mirror is part of the first carriage member (6 in FIG. 1) and is fixedly mounted thereon.

On the rod-shaped guides 33, further sleeves 72, 73 are arranged free from tilting; they are connected by a rod 74 and form part of the second carriage member (7 in FIG. 1). In the second carriage member and to the left of the mirror 71, mirrors 75, 76 are provided, substantially at right angles to one another.

All the mirrors are supported at their edges near the walls extending parallel to the plane of the drawing so that the central area is free.

It will be seen that the sleeve 62 of the first carriage member is arranged between the sleeves 72, 73 of the second carriage member, which is a particularly space-saving arrangement free from inclination. Further it will be seen that all the mirrors are arranged on the carriage members and are thus movable, whereby the mirrors extend in a direction transverse to the direction of movement of the carriage members.

The rods 33 of the guide are positioned at one end in the area of the end wall of the housing. In the embodiment illustrated they extend over the whole length of the housing and alongside the side walls of the compartment 42 extending parallel to the plane of the drawing at such a distance that the guide means of the separate carriage members can run alongside these side walls. The bearing is indicated at 77 in FIG. 3, for example. At the other end, the rods 33 are located in a bearing 78 arranged on the end wall 79.

A cable guide pulley 80 (28 in FIG. 1) is rotatably located on the second carriage member, in particular in the area of the sleeve.

The driving arrangement is somewhat different from that illustrated schematically in FIG. 1. For example, at the height of the compartment 42, there is provided a drive pulley or a coiled-disc wheel 81 for a cable line 82 which can pass through the partition wall 60 or is guided near the compartment to a coiled-disc wheel 80 outside the compartment. The coiled-disc wheel 81 is connected with a drive motor 93. The cable line 82 is secured at 83 to the sleeve 61 of the first carriage or at 84 to the sleeve 62 of the first carriage. A cable line secured to the sleeve 61 of the first carriage extends therefrom and is guided about guide pulley 80 and is secured at 87 to the end wall 88 of the apparatus. Either the sleeve 72 of the second carriage or the sleeve 73 of this carriage serves as an abutment for a tension spring 89 which is secured to the end wall 79 of the housing beneath the bearing 78, for example at 90. The arrangement of the spring at the sleeve 72 has the advantage that a longer spring can be used so that there is the possibility of considerable expansion with approximately the same spring tension.

In FIG. 2 the parts are illustrated in the starting position in which the exposure aperture 68 lies to the left of the support surface 32.

Figure 3:
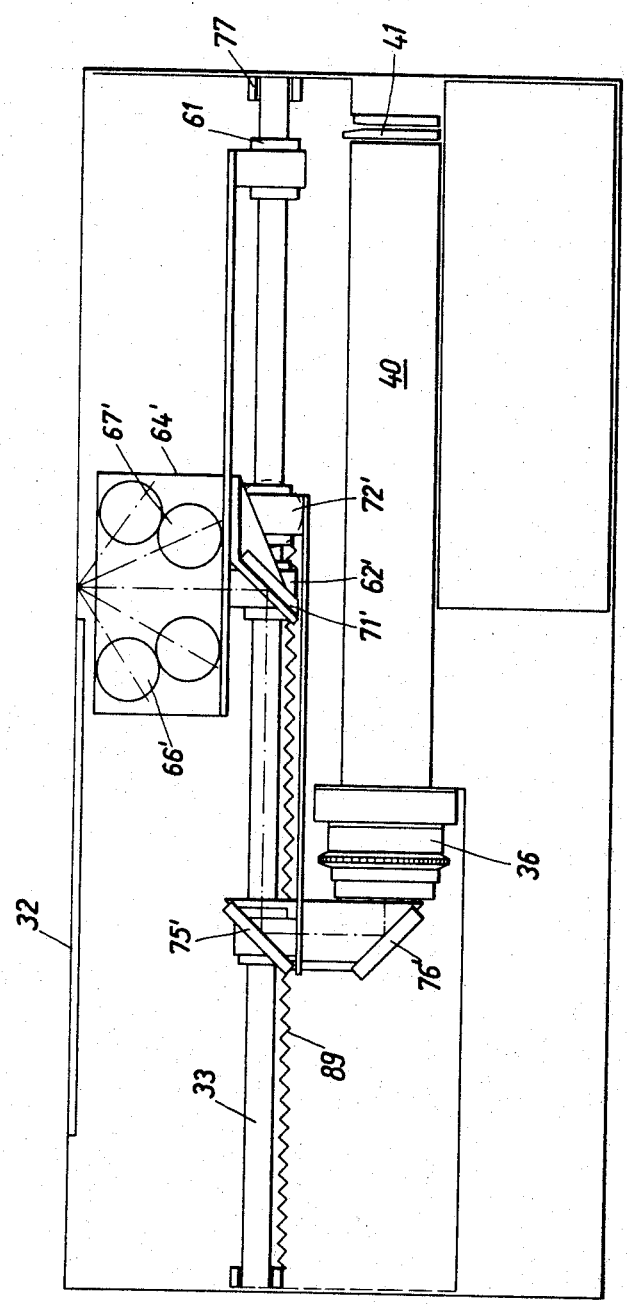
FIG. 3 is a view similar to FIG. 2 in which the carriage is in the other end position.

In FIG. 3 the same parts are indicated by the same references but with a dash when they are in different positions. FIG. 3 shows only the conveying devices and the carriage members and the compartments 42 and 52 with their associated devices shown in FIG. 2 are not included.

Whereas in FIG. 2 the sleeve guides 62 and 73 on the one hand and 61 and 72 on the other hand of the two carriage members are close together, in FIG. 3 the sleeve members 62' and 72' of the carriage members are now close together. Whereas in FIG. 2 the carriage members are located one inside the other so that the mirrors 71, 75 are closely adjacent, in FIG. 3 the carriage members have been extended one from the other so that the mirrors 71' and 75' are spaced apart by the greatest possible distance.

In this position the spring 89 is tensioned. The second carriage member with the mirrors 75' and 76' is in a position in which the mirror 76' is directly in front of the lens 36. The first carriage member is so arraanged that the compartment 64' containing the light sources 66, 67 in FIG. 2 and 66' and 67' in FIG. 3 and supported on the sleeve 62 or 62' is located to the right of the support surface.

In this way the drive pulley 81 of FIG. 2 is rotated in a clockwise direction in order to move the first carriage member with the sleeves 61, 62 to the right by the cable line 82. The cable line 85 is thereby engaged so that the second carriage member is moved by only half the distance of the first carriage member as is explained above in conjunction with FIG. 1. Thus the distance between the sleeves 61, 62 of the first carriage member is also only half as large as the half distance travelled by the first carriage member with the compartment 64.

It is pointed out that the solution described with the drive is a particularly advantageous embodiment since a large travel distance for the carriage members is achieved in the smallest possible space so that guiding is effected without tilting. Moreover, the devices associated with the sleeves 62' and 72' can form a stop member in the right-hand end position which prevents further movement. As a result, special stop means are not required. It will be understood that in this embodiment contact switches can be provided between the sleeves 62, 72 in order to perform switching operations, for example for actuating the exposure light sources, for actuating a pressure plate (not shown), or for guiding the copying material.

It is also pointed out that the guide arrangements can differ from those described. For example, the rods 33 could be constructed as axles, but in this case separate axles would have to be provided for the two carriage members.

Where reference is made in the foregoing description to two carriage members, it will be apparent that two completely separate carriages are intended which are synchronised for operation according to a predetermined system. Thus reference can be made also to two carriages. The two carriage members could be referred to differently, for example the carriage member with the exposure aperture 68 as the movable assembly which also carries a mirror 71, exposure sources 66, 67 and the housing 64. The other carriage member with the mirrors 75, 76 can be referred to as the movable support member for these mirrors.

In FIG. 2, drives 94, 95, 96 are indicated between the drive motor 93, for driving the coiled-disc roller 81, and the withdrawal device 44, the cutting device 45 and the roller guide means 49, 50. These drives effect controlled advance of the band-shaped copying material 43 and periodic cutting thereof corresponding to the movement of the carriage member 63. The drives can be effected in the usual, known manner.

The explanation in conjunction with FIGS. 2 and 3 makes it clear that a relatively low and narrow device can be provided which is restricted to the space beneath the support surface 32, so that it is not necessary for the apparatus to extend laterally of the support surface 32.

I claim:

1. A device for the optical exposure of an original on flat copying material which is movably arranged, comprising a housing; a support surface 32 provided in one housing wall 31 and made of transparent material, the original being arranged on the support surface; an exposure plate 41 provided in the housing spaced from the support surface and over which the flat copying material is movable; exposure means arranged between the support surrface and the exposure plate 41 and including a stationary lens 36 rigidly arranged in the housing with respect to the exposure plate 41; a reflector arrangement located between the lens and the support surface 32 and including a plurality of mirrors divided into a first group and a second group, the two groups being conjointly displaceable; guide means arranged in the housing and guiding the two groups of mirrors for conjoint movement parallel to the support surface; and control means connected to the first and second groups of mirrors and operable, upon movement of the mirrors, to modify a first ray path, between the lens and one mirror of one group, in a manner equal and opposite to the modification of a second ray path, between two mirrors of the other group, whereby an image ray extending between the support surface and one mirror of one group, produced on exposure of the original, always follows a path of constant length regardless of the position of a mirror with respect to the original.

2. A surface exposure device with a housing, a transparent support surface for an original in one upper wall of the housing, an exposure surface arranged within the housing and located in a plane perpendicular to the plane of the support surface, first guide means arranged in the housing beneath and near the support surface and parallel thereto, an assembly mounted for movement on said first guide means parallel to the support surface, a narrow exposure aperture 68 located on the assembly beneath the support surface and having a length corresponding to the width of the support surface, exposure light sources 66, 67 arranged on the assembly and associated with the exposure aperture in order to illuminate the exposure aperture, a first group of mirrors including a mirror connected with the assembly, movable therewith and inclined at 45° with respect to the plane of the support surface and arranged beneath the exposure aperture, second guide means arranged in the housing and extending in the same direction as the first guide means, support means movably positioned on the second guide means, a second group of mirrors arranged on the support means and comprising two mirrors, a first mirror of the second group being associated with the mirror on the assembly and the optical axes of both mirrors coinciding, a second mirror of the second group being displaced by 90° with respect to the first mirror of the second group and spaced therefrom on the support means, a lens positioned between the exposure surface and the second mirror, and arranged with its axis coincident with the optical axis of the second mirror and with the central axis of the exposure surface, further moving means provided in the housing and operable to move the assembly and the support means conjointly in a direction parallel to the axis of the lens, controlling connection means connected to the assembly and the support means and operable to move the latter in the same direction but by only half the distance by which the assembly is moved, and further guide means and drive means provided at the exposure surface and operable to move copying material, to which the original has been transferred, to the exposure surface in synchronism with the assembly.

3. A device according to claim 2, including connection means provided between the moving means and the drive means and operable to synchronise the movement of the exposure aperture relative to the support surface 32 and the movement of the copying material relative to the exposure surface.

4. A device according to claim 2, in which the first and second guide means are rods positioned on the framework and extending in a direction parallel to the lens axis, the assembly and the support means having sleeve-like guide parts which are movable on the rods.

5. A device according to claim 4, in which the assembly with the exposure aperture has at least two spaced assembly guide parts on one side, the support means has at least two spaced support means guide parts on the same side, and these assembly and support means guide parts are arranged to telescope one inside the other on the guide means, whereby the two guide parts which belong to one of the elements which comprise the assembly and the support means have a reciprocal spacing which is approximately equal to the relative movement between the assembly and the support means.

6. A device according to claim 5, in which the assembly is a first carriage member and the support means is a second carriage member, and including switch means positioned between the sleeve-like guide means of the different carriage members and included in a circuit for the exposure sources.

7. A device according to claim 2, in which the controlling connection means between the assembly and the support means comprises a cable line having one end connected to one of the elements which include the assembly and the support means, and a cable pulley arranged on the other element and around which the cable line is guided, the free end of the cable line being fixed to the housing, and a spring connected between the housing and the other element and biasing the other element away from the attachment point of the cable line to the housing, the moving means being connected with the first element to move the latter.

8. A device according to claim 7, in which the other element with the guide pulley form the support means.

9. A device according to claim 2, in which the first and second guide means are rods and the first mirror of the second group is arranged at the same distance from the support surface as the mirror of the first group, and parallel with the latter, the two mirrors of the two groups deflecting the ray through 180°.

10. A copying device, comprising, in combination, a housing including a support surface for an original to be copied; an exposure plate in said housing; first guide means operable to guide substantially flat copying material over said exposure plate; exposure means arranged in said housing between said support surface and said exposure plate and including a first unit; second guide means mounting said first unit for movement parallel to said support surface; said exposure means including a first reflector on said first unit oriented at an angle of 45° with respect to said support surface, and including a second unit; third guide means mounting said second unit for movement parallel to said support surface; said exposure means further including ray deflecting means on said second unit; the exit direction of said first reflector coinciding centrally with an entry surface of said deflecting means; an object lens positioned in a reproduction ray extending from said first reflector to said exposure plate; and driving means connected to both said units for moving said units conjointly along their respective guide means while moving said first unit at twice the velocity of said second unit.

11. A copying device, as claimed in claim 10, in which said second and third guide means comprise guide elements of the same type.

12. A copying device, as claimed in claim 10, in which said deflecting means comprises two reflectors arranged at an angle of 90° to each other, one of said two reflectors being arranged parallel to said first reflector.

13. A copying device, as claimed in claim 10, in which said driving means includes a spring connected between said second unit and a frame included in said housing, a cable line, and a guide roller for the cable line; said guide roller being mounted on said second unit; said cable line having one end secured in said frame and being trained about said guide roller to extend in the opposite direction; and cable take-up means connected to the other end of said cable line.

References Cited

UNITED STATES PATENTS 2,851,922  9/1958  Rosin _____ 88—24

NORTON ANSHER, *Primary Examiner.*

R. A. WINTERCORN, *Assistant Examiner.*